United States Patent
Morrison

(10) Patent No.: US 11,203,444 B2
(45) Date of Patent: Dec. 21, 2021

(54) ARM REMOVAL SYSTEM

(71) Applicant: Matthew Morrison, Leonardtown, MD (US)

(72) Inventor: Matthew Morrison, Leonardtown, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 133 days.

(21) Appl. No.: 16/842,165

(22) Filed: Apr. 7, 2020

(65) Prior Publication Data

US 2021/0309391 A1  Oct. 7, 2021

(51) Int. Cl.
*B64F 5/50* (2017.01)
*B23P 19/02* (2006.01)

(52) U.S. Cl.
CPC .............. *B64F 5/50* (2017.01); *B23P 19/025* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,288,906 A * | 7/1942 | Kaplan | ................. | B25B 27/062 29/260 |
| 4,409,731 A * | 10/1983 | Campbell | ............. | B23P 11/025 29/426.1 |
| 4,502,197 A * | 3/1985 | Harder | ................ | B25B 27/0028 29/259 |
| 4,771,528 A * | 9/1988 | Stromberg | ............ | B25B 27/023 29/259 |
| 5,906,034 A * | 5/1999 | Weisshaar | ............. | B25B 27/062 29/257 |
| 6,012,211 A * | 1/2000 | Ochoa | ..................... | B25B 27/02 29/244 |
| 6,880,218 B2 * | 4/2005 | Christopher | ........ | B25B 27/0035 29/239 |
| 7,272,886 B2 * | 9/2007 | Thomson | .............. | B25B 27/023 29/724 |
| 7,770,277 B2 * | 8/2010 | Wridt | .................... | B25B 27/023 29/261 |
| 8,800,126 B2 * | 8/2014 | Shen | ....................... | B25B 27/16 29/253 |
| 9,663,224 B2 * | 5/2017 | Elmore | ..................... | B64F 5/50 |
| 9,969,214 B1 * | 5/2018 | Gesto | .................... | B25B 27/062 |
| 10,137,730 B2 * | 11/2018 | Liukas | ................ | B25B 27/0028 |
| 2004/0143949 A1 * | 7/2004 | Christopher | .......... | B25B 27/023 29/402.03 |

(Continued)

*Primary Examiner* — Lawrence Averick
(74) *Attorney, Agent, or Firm* — Mark O. Glut; NAWCAD

(57) ABSTRACT

An arm removal system for removing an arm. The system includes an anvil, and a removal assembly with at least two jackscrews. The arm has an extension radially extending from the arm and an arm outer surface. The arm is disposed within a wedge shaped collet that is disposed within a socket in an aircraft with an aircraft outer surface. The removal assembly includes an extension engaging surface and threaded jackscrew holes for accepting the jackscrews, such that when the jackscrews are tightened within the jackscrew holes, the jackscrews apply force on the anvil and the aircraft outer surface in the direction away from the removal assembly such that the arm is eventually removed entirely from the aircraft.

1 Claim, 4 Drawing Sheets

(56) References Cited

U.S. PATENT DOCUMENTS

| | | | |
|---|---|---|---|
| 2005/0086781 A1* | 4/2005 | Thomson | B25B 27/023 29/251 |
| 2006/0053609 A1* | 3/2006 | Wridt | B25B 27/023 29/261 |
| 2012/0174363 A1* | 7/2012 | Shen | B25B 27/023 29/253 |
| 2014/0026403 A1* | 1/2014 | Elmore | B64C 27/32 29/700 |
| 2016/0318339 A1* | 11/2016 | Liu | B25B 27/0028 |

* cited by examiner

ARM REMOVAL SYSTEM

STATEMENT OF GOVERNMENT INTEREST

The invention described herein may be manufactured and used by or for the Government of the United States of America for governmental purposes without payment of any royalties thereon or therefor.

BACKGROUND

The military aircraft MQ-8C Fire Scout and OH-58 Kiowa have similar configurations for attaching store stations to the fuselage. In these aircraft, a universal weapons pylon (UWP) is inserted into a weapons socket on the aircraft. There are two such sockets on an aircraft on opposite sides of the aircraft. The weapons socket's axis is oriented laterally to the aircraft. An expanding bolt is typically placed through holes in the socket and the UWP, which fixes the UWP location in the socket. A collet nut on the UWP is tightened to press a wedge shaped collet into the outer opening of the socket, and a 250 ft-lbs torque is applied to the collet nut, so that torsional forces are resisted by the collet as opposed to the expanding bolt. The removal of the UWP is very difficult and time consuming. Currently, a hydraulic cylinder is placed between the two inner ends of the left and right UWPs. For certain aircraft, such as the MQ-8C Fire Scout this is not possible because that area is occupied by a fuel tank.

Thus there is a need for an arm removal system that removes the universal weapons pylon.

SUMMARY

The present invention is directed to an arm removal system with the needs enumerated above and below.

The present invention is directed to arm removal system that can easily remove an arm from an aircraft.

It is a feature of the present invention to provide an arm (or universal weapons pylon) removal system that is compatible with aircraft of a common design, including the MQ-8C Fire Scout.

It is a feature of the present invention to provide an arm (or universal weapons pylon) removal system that can be operated from the outside of the aircraft and does not require the user to enter the aircraft.

DRAWINGS

These and other features, aspects and advantages of the present invention will become better understood with reference to the following description and appended claims, and accompanying drawings wherein:

DESCRIPTION

Figure 1:
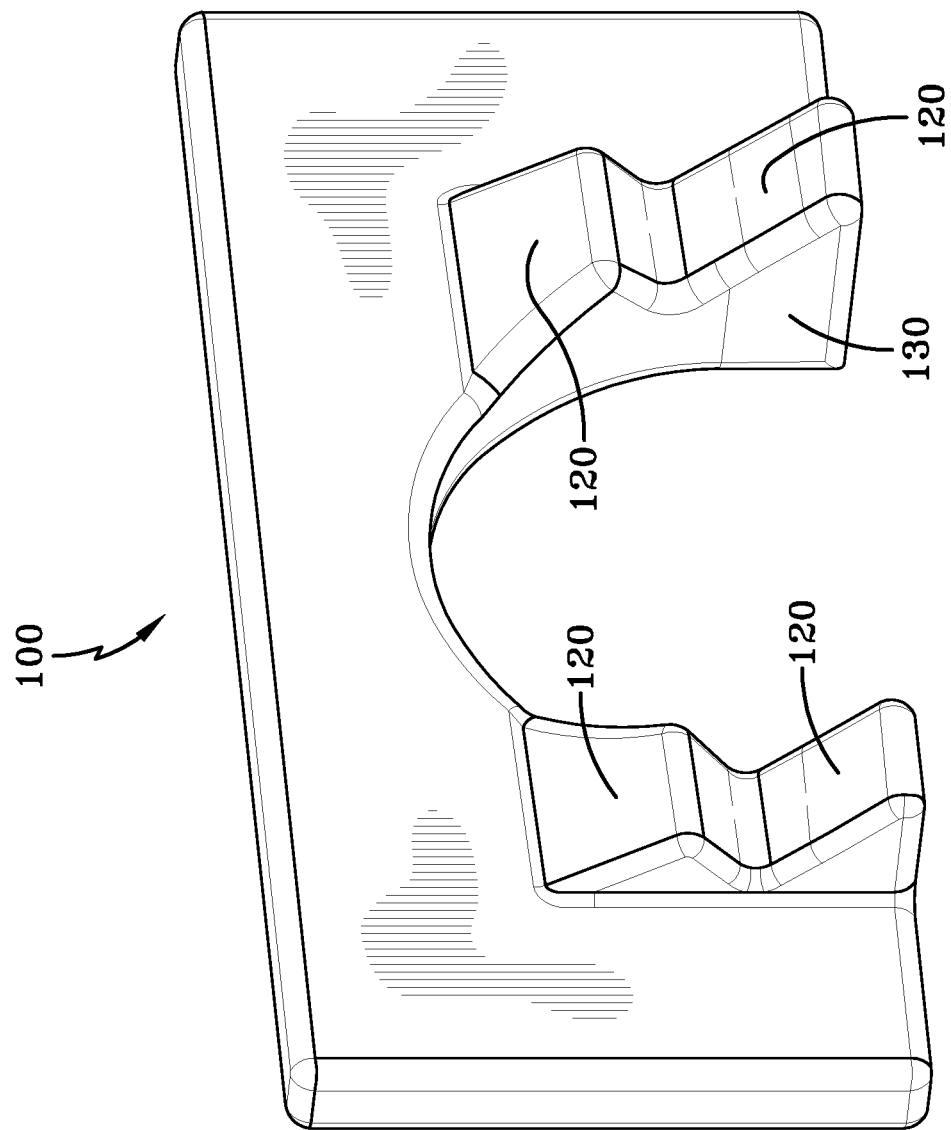
FIG. 1 is a perspective view of the anvil of the arm removal system.
Figure 2:
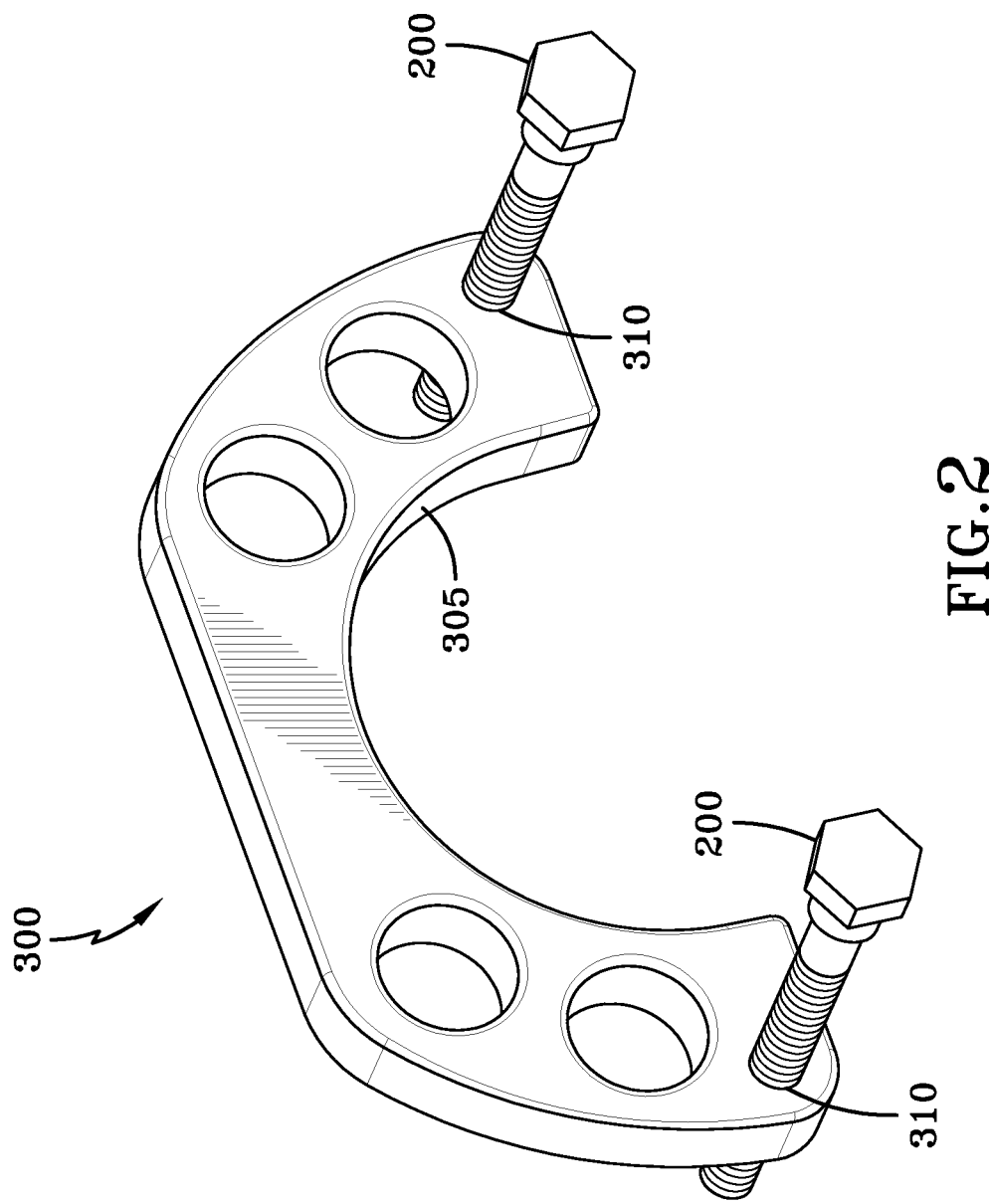
FIG. 2 is a perspective view of the removal assembly with jackscrews.
Figure 3:
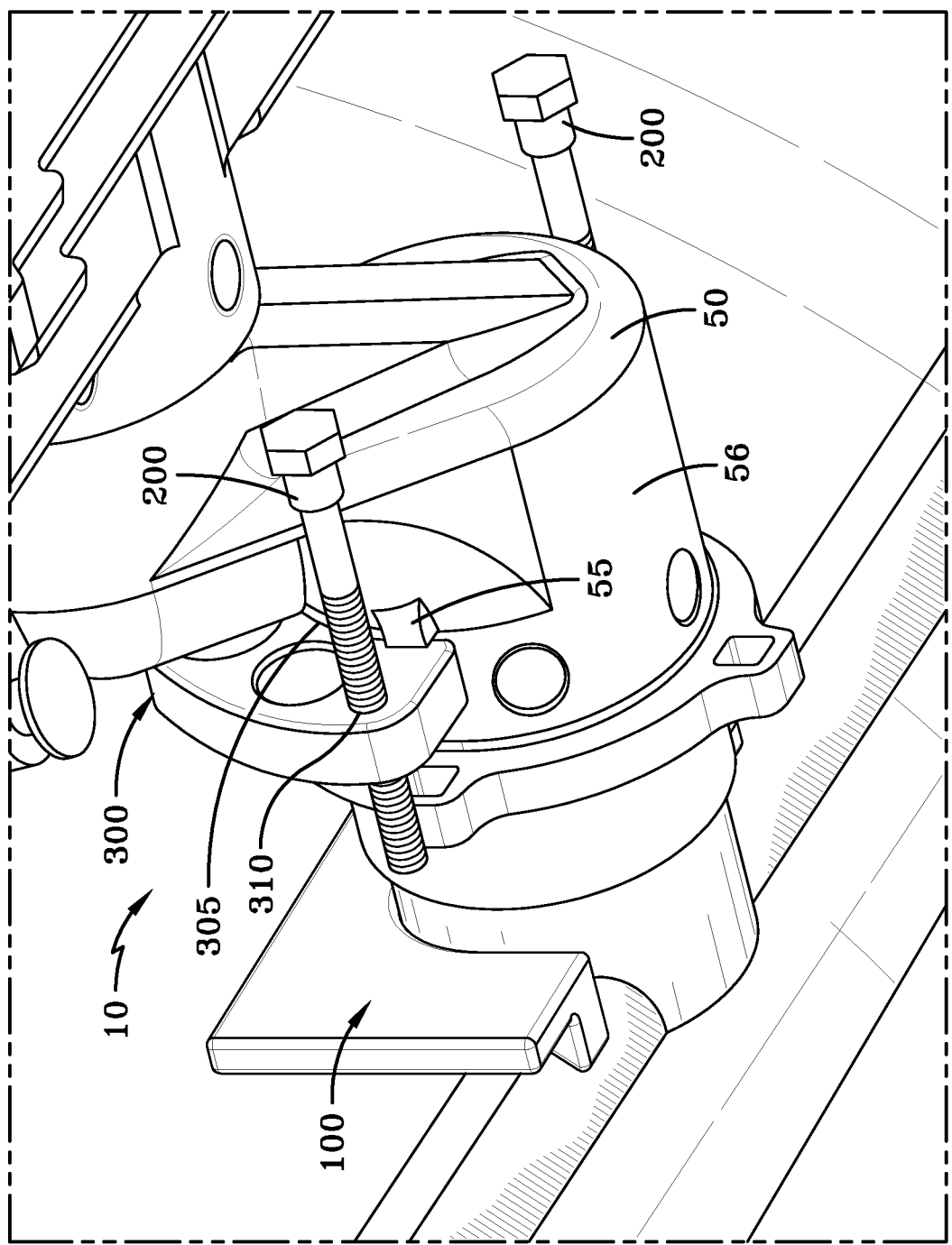
FIG. 3 is a perspective view of the arm removal system on the arm.
Figure 4:
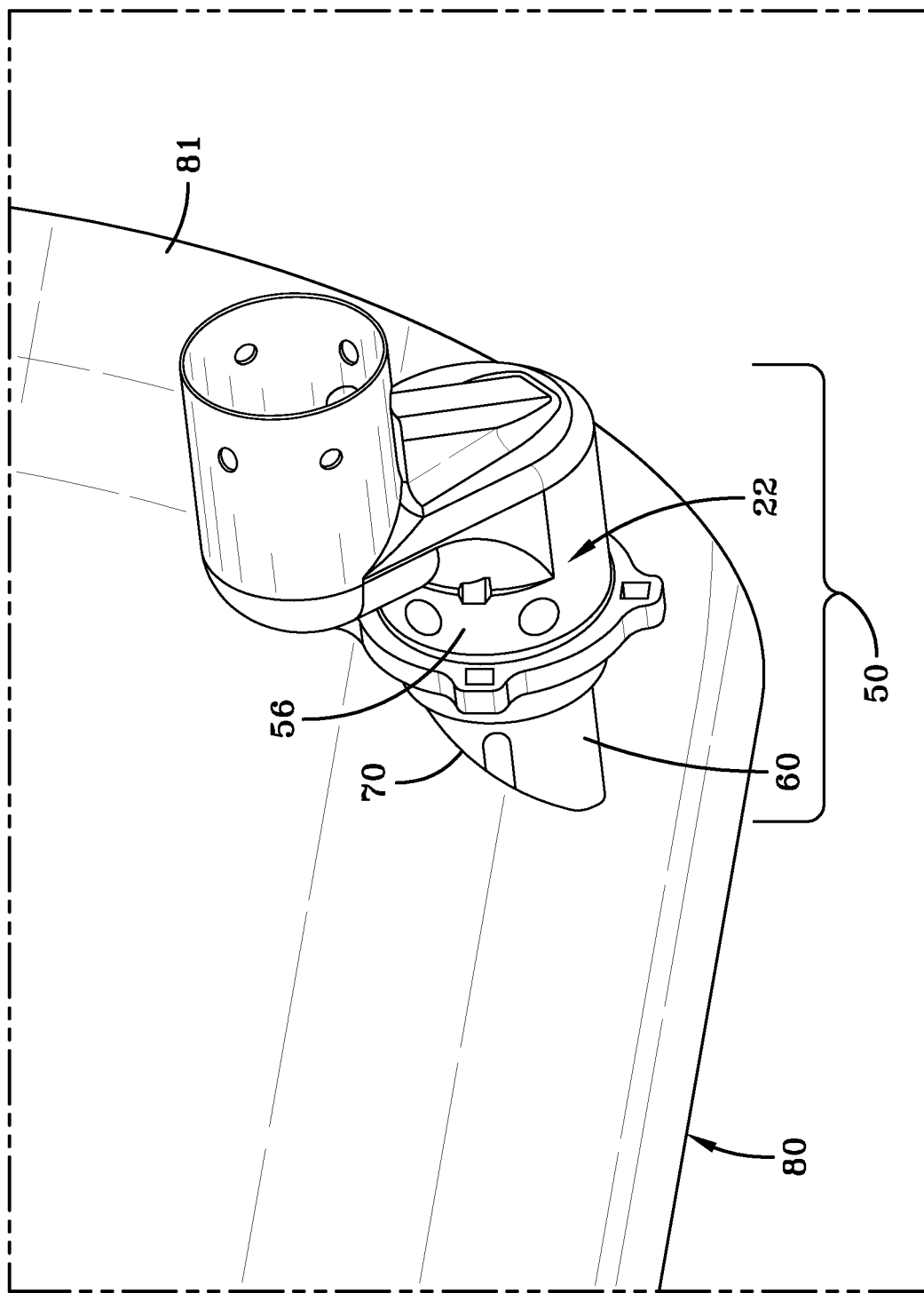
FIG. 4 is a perspective view of the arm and socket without the removal system.

The preferred embodiments of the present invention are illustrated by way of example below and in FIGS. 1-4. As seen in FIGS. 3 and 4, the arm removal system 10 for removing an arm 50 includes an anvil 100, and a removal assembly 300 with at least two jackscrews 200. The arm 50 has an extension 55 radially extending from the arm 50 and an arm outer surface 56 having a circumference 22. The arm 50 is disposed within a wedge shaped collet 60 and the collet 60 is disposed within a socket 70 in an aircraft 80 with an aircraft outer surface 81. As shown in FIG. 1, the anvil 100 has an aircraft engaging surface 120 that corresponds to the aircraft outer surface 81, and an inner surface 130 that corresponds to the arm outer surface 56, such that when in place, the anvil 100 envelopes the arm outer surface 56 and engages with the aircraft outer surface 81. The removal assembly 300 has a removal system inner surface 305 that corresponds to a portion of the arm outer surface 56. As shown in FIG. 2, the removal assembly 300 also includes an extension engaging surface and threaded jackscrew holes 310 for accepting the jackscrews 200, such that when the jackscrews 200 are tightened within the jackscrew holes 310, the jackscrews 200 apply force on the anvil 100 and the aircraft outer surface in the direction away from the removal assembly 300 and as a result the extension engaging surface applies an opposite force on the extension 55 such that the arm 50 is moved axially along the socket and eventually removed entirely from the aircraft.

In the description of the present invention, the invention will be discussed in a military aircraft environment; however, this invention can be utilized for any type of application that requires use of an arm removal system.

In operation, the anvil 100 is placed over the arm 50 (or a universal weapons pylon on a military aircraft). The removal assembly 300 is then placed on the arm 50 so that corresponding surfaces are engaged. The jackscrews 200 are then threaded through the jackscrew holes 310, and turned until the jackscrews 200 engage the anvil 100. The jackscrews 200 are tightened until the arm is extracted from the socket.

In another embodiment of the invention, there may be a variant of the engaging style. The other embodiment may include an extension on the removal assembly 300 to engage a groove in the arm 50.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred embodiments thereof, other embodiments are possible. Therefore, the spirit and scope of the appended claims should not be limited to the description of the preferred embodiment(s) contained herein.

What is claimed is:

1. An arm removal system for removing an arm, the arm having an extension radially extending from the arm and an arm outer surface, the arm disposed within a wedge shaped collet and the wedge shaped collet disposed within a socket in an aircraft with an aircraft outer surface, the arm removal system comprising:

an anvil having an aircraft engaging surface that corresponds to the aircraft outer surface, and an inner surface that corresponds to the arm outer surface, such that when attached to each other the anvil envelops the arm outer surface and engages with the aircraft outersurface;

at least two jack screws;

a removal assembly having a removal system inner surface corresponding to a portion of the arm outer surface, the removal assembly having an extension engaging surface and threaded jack screw holes for accepting the jackscrews, such that when the jack screws are tightened within the jack screw holes, they apply force on the anvil and the aircraft outer surface in a direction away from the removal assembly and as a result the extension engaging surface applies an opposite force on the extension such that the arm is moved axially along the socket and eventually removed entirely from the aircraft.

\* \* \* \* \*